(12) United States Patent
Da Palma et al.

(10) Patent No.: US 7,099,442 B2
(45) Date of Patent: Aug. 29, 2006

(54) TELEPHONY AND VOICE INTERFACE FOR VOICE SERVER SYSTEM MANAGEMENT

(75) Inventors: William V. Da Palma, Coconut Creek, FL (US); Ricardo dos Santos, Boca Raton, FL (US); Victor S. Moore, Boynton Beach, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/302,437

(22) Filed: Nov. 22, 2002

(65) Prior Publication Data

US 2004/0101122 A1 May 27, 2004

(51) Int. Cl.
*H04M 1/64* (2006.01)

(52) U.S. Cl. .............................. 379/88.22; 379/88.01; 379/88.17

(58) Field of Classification Search ............... 379/67.1, 379/88.01, 88.15, 88.16, 88.17, 88.18, 88.22, 379/88.23
See application file for complete search history.

(56) References Cited

U.S. PATENT DOCUMENTS

| | | | | |
|---|---|---|---|---|
| 5,359,598 | A | 10/1994 | Steagall et al. | 370/58.1 |
| 5,742,596 | A | 4/1998 | Baratz et al. | 370/356 |
| 6,088,365 | A | 7/2000 | Kurdzo et al. | 370/466 |
| 6,118,780 | A | 9/2000 | Dunn et al. | 370/355 |
| 6,161,139 | A * | 12/2000 | Win et al. | 709/225 |
| 6,647,383 | B1 * | 11/2003 | August et al. | 707/3 |
| 6,690,786 | B1 * | 2/2004 | Kowal et al. | 379/221.01 |
| 6,785,654 | B1 * | 8/2004 | Cyr et al. | 704/270.1 |
| 6,850,603 | B1 * | 2/2005 | Eberle et al. | 379/88.16 |

FOREIGN PATENT DOCUMENTS

| | | |
|---|---|---|
| JP | 2002-057724 | 2/2002 |
| WO | WO99/60813 | 11/1999 |
| WO | WO01/17286 | 3/2001 |

OTHER PUBLICATIONS

U.S. Appl. No. 09/649,121, filed Aug. 28, 2000, Da Palma et al.
M. Leander, *Voice Response—A Technology for Solving Management Problems, Speech Technology*, vol. 3, No. 2, pp. 50-52, (Mar.-Apr., 1986).
D. B. Terry, et al., *Managing Stored Voice In The Etherphone System, ACM Transactions on Computer Systems*, vol. 6, No. 1, pp. 3-27, (Feb. 1988).
C. M. Breant, et al., *Integration of a Voice Processor Machine in a PACS, Computerized Medical Imaging and Graphics*, vol. 17, No. 1, pp. 13-19, (1993).
A. Sulkin, *Call Centers—Distributed Call Management Centers, Business Communications Review*, vol. 23, No. 12, pp. 14-19, (Dec. 1993).

(Continued)

*Primary Examiner*—Bing Q. Bui
(74) *Attorney, Agent, or Firm*—Akerman Senterfitt

(57) ABSTRACT

A method of administering a voice server can include, within the voice server, receiving a call from a system administrator. Call control data of the received call can be matched with a system administration application of the voice server. The system administration application can be executed. Responsive to the executing step, communications between the system administration application and a resource management system of the voice server can be established such that the system administrator can interact with the resource management system to request administrative functions over the call.

43 Claims, 2 Drawing Sheets

OTHER PUBLICATIONS

K. Horowitz, et al., *Talk To Me—Using Voice Server To Enable Business-To-Business Communication, Network Intelligence: Internet-Based Manufacturing*, Proc. of SPIE, vol. 4208, pp. 131-139, (Nov. 8, 2000).

S. C. Arnold, et al., *Programming by Voice, VocalProgramming, Assets '00*, pp. 149-155, (Nov. 13-15, 2000).

*Bitpipe: Systems Management Software*, <http://www.bitpipe.com/data/rlist?t-987097377_2199321&sort_by=status&src=google>, (viewed Jul. 15, 2002).

*SMS Systems Management Server 2.0 25C NT/W2K—Latest Prices*, <http://google.cnet.com/shopping/resellers/0-11596-311-186487-0.html?tag=pt.google.sms>, (viewed Jul. 15, 2002).

*Compare Prices at NexTag—Voice Interface*, <http:/www.nextag.com/serv/main/buyer/OutPDIR.jsp?nxtg=1e5937_3CCA25801C763003&n...>, (viewed Jul. 15, 2002).

\* cited by examiner

TELEPHONY AND VOICE INTERFACE FOR VOICE SERVER SYSTEM MANAGEMENT

BACKGROUND OF THE INVENTION

1. Technical Field

This invention relates to the field of telecommunications and, more particularly, to managing and administering a voice server through a voice and/or telephony interface.

2. Description of the Related Art

Voice-based applications have become increasingly popular as a means to access data and applications. Voice-based applications are those that allow a user to select menu items or enter data into entry fields using a conventional telephone, a wireless telephone, or another audio interface. Advances in the interfaces between the digital data domain and the voice domain have led to increased use of voice-based technology for accessing traditional personal and business applications. In consequence, more often than not, users can interact with systems through traditional voice communications and/or a telephone keypad.

Typically, voice-based services are implemented using one or more distributed computers or servers executing appropriate software, which collectively can be referred to as a "voice server". A voice server can provide functionality such as a telephony platform connector for interfacing with a telecommunications network, speech processing resources for performing text-to-speech and speech recognition, development tools, and/or other interfaces which allow the voice server to interact with one or more application programs and control systems.

Presently, system management and administration in a voice server environment follows the traditional model of command-line or console-based control. That is, a system administrator interacts with the voice server via a conventional computer terminal, having a keyboard and display, which is communicatively linked to the voice server. The administration terminal frequently is located "on-premises" with the voice server. The system administrator can receive notifications and monitor the voice server by viewing messages on the administration terminal display. The system administrator can provide instructions, queries, or other commands to the voice server by entering the appropriate information into a command line interface of the administration terminal display using the administrative terminal keyboard.

Through the administration terminal, the system administrator can interact with the voice server to perform administrative, managerial, and maintenance functions. Legacy software components, for example components written in the C programming language, typically are managed through Simple Network Management Protocol (SNMP) via the administration terminal.

Other systems have come to use a resource management system for handling communications between the administration terminal and the voice server. For example, within a Java environment, the resource management system can be a Java Management Extension (JMX) enabled system for managing Java components. JMX is defined in the document entitled *Java Management Extensions Instrumentation and Agent Specification*, v1.1 (March 2002), published by Sun Microsystems, Inc. of Palo Alto, Calif. The JMX specification, which is incorporated herein by reference, defines an architecture, design patterns, application programming interfaces (APIs), and services for application and network management using the Java programming language. The JMX specification is a set of specifications and development tools for managing Java environments and building management solutions.

Conventional console-based administrative terminals lack an interface which exploits the technology which the voice server was designed to provide to users. In consequence, conventional voice servers lack a more natural interface through which the voice server can be managed, administered, and/or maintained by a system administrator.

SUMMARY OF THE INVENTION

The invention disclosed herein provides a solution for administering, managing, and maintaining (collectively "administering") a voice server. More particularly, the present invention allows a voice server to be administered over a telecommunications network rather than via a conventional administrative console which typically resides "on-premises" with the voice server or interactive voice response system. Accordingly, a system administrator can perform various functions-with regard to a voice server through a telephone or other voice communications link whether the system administrator is located "on-premises" with the voice server or is remotely located in relation to the voice server.

For example, functions regarding security, data back-up and redundancy, reporting voice server loads or generating other reports, reloading applications and/or data, performing system resets and the like can be performed by a system administrator over a telecommunications network over an established inbound call. Still, the voice server can initiate an outbound call over the telecommunications network to a system administrator in the event that a particular condition within the voice server is detected. Accordingly, those functions which are accessed using an administrative terminal in conventional systems can be accessed via a speech and/or telephony interface in the present invention.

One aspect of the present invention can include a method of administering a voice server. The method can include, within a voice server, receiving a call from a system administrator. Call control data of the received call can be matched with a system administration application of the voice server. The system administration application can be retrieved from an application server and loaded into a voice browser included within the voice server. Notably, the system administration application can be implemented as a Voice Extensible Markup Language document.

The system administration application can be executed. Responsive to the execution of the system administration application, communications between the system administration application and a resource management system of the voice server can be established. For example, the resource management system can include a Java Management Extension enabled system and/or a Simple Network Management Protocol based system. Accordingly, the system administrator can interact with the resource management system to request administrative functions over the call.

The method further can include receiving input from the system administrator over the call. The input, for example, can include speech signals and/or dual tone multi-frequency signals. In any case, the input can be processed to determine an administrative function for the voice server which corresponds to the input. The administrative function can be activated within the voice server through the resource management system. Notably, the system administration application can query the resource management system for administrative information. Administrative information from the voice server can be provided over the call.

According to another aspect of the present invention, a triggering event within the voice server can be detected. The triggering event can be matched to a predetermined system administration application, which can be invoked thereby establishing communications between the system administration application and the resource management system of the voice server. The invoking step can include instructing a voice browser within the voice server to retrieve the system administration application from an application server, load the system administration application into the voice browser, and execute the system administration application. The system administration application can be implemented as a Voice Extensible Markup Language document.

As mentioned, the resource management system can include a Java Management Extension enabled system and/or a Simple Network Management Protocol based system. An outbound call can be placed to a number specified by the system administration application. The system administration application can query the resource management system for administration information corresponding to the triggering event. Administration information associated with the triggering event can be provided over the call.

The method further can include receiving input from a system administrator via the call, processing the input to determine an administrative function for the voice server which corresponds to the input, and activating the administrative function within the voice server.

Another aspect of the present invention can include, within a voice server, receiving a call from a system administrator. Call control data of the call can be matched with an application configured to dynamically generate a system administration application of the voice server. The application can be executed to generate the system administration application. Notably, according to one embodiment of the invention, an operational state of the voice server can be detected and the system administration application can be generated in accordance with the detected operational state.

The system administration application can be executed thereby establishing communications between the system administration application and a resource management system of the voice server. Accordingly, the system administrator can interact with the resource management system to request administrative functions over the call.

Another embodiment of the present invention can include detecting a triggering event within the voice server and matching the triggering event with a predetermined application configured to dynamically generate a system administration application of the voice server. The application can be executed to generate the system administration application. The dynamically generated system administration application can be invoked thereby establishing communications between the system administration application and a resource management system of the voice server. An outbound call can be placed by the voice server to a number specified by the system administration application.

Another aspect of the present invention can include a voice server which can be administered via a telecommunications link. The voice server can include an application execution environment and a telephony-enabled system administration application executing within the application execution environment of the voice server. The voice server can include a telephony interface configured to place outbound calls or to receive inbound calls thereby establishing a telecommunications link under the direction of the telephony-enabled system administration application. The voice server also can include a resource management system configured to monitor and manage resources of the voice server. The voice server further can include a system management component configured to exchange communications between the telephony-enabled system administration application and the resource management system. Accordingly, the resource management system can respond to administration commands received over the telecommunications link and can provide administration information to the telephony-enabled system administration application to be played over the telecommunications link.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for administering, managing, and maintaining (collectively "administering") a voice server. More particularly, the present invention allows a voice server to be administered over a telecommunications network rather than via a conventional administrative console. Accordingly, a system administrator can perform various administrative functions with regard to a voice server through a telephony or voice interface which is communicatively linked with the voice server through a telecommunications network. Moreover, the voice server can initiate communications with a system administrator via the telecommunications network in the event that a particular event or condition within the voice server should arise.

Figure 1:
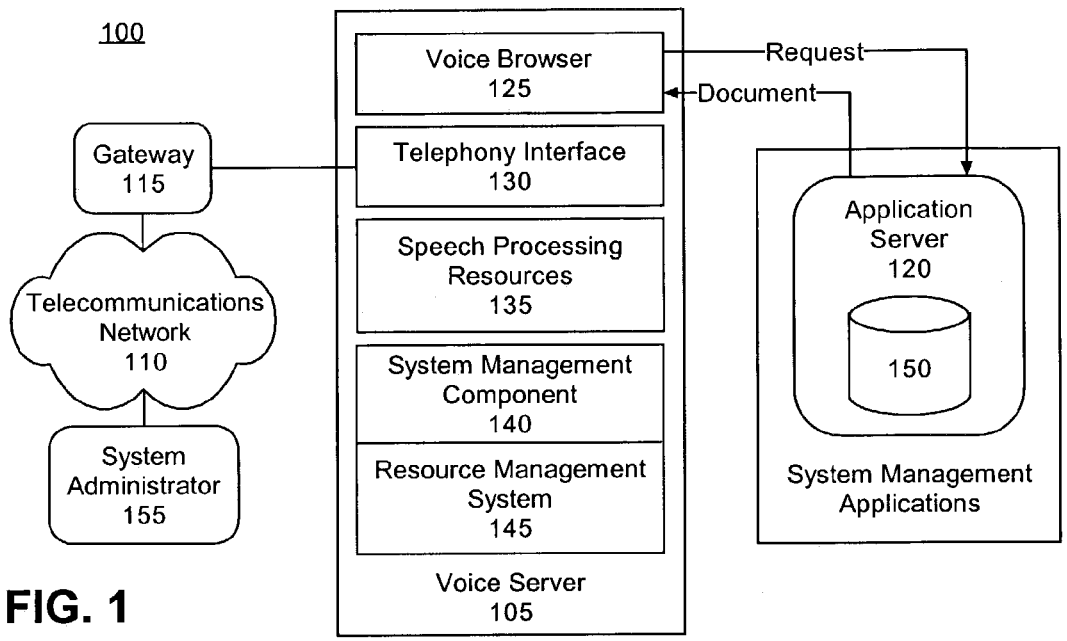
FIG. 1 is a schematic diagram illustrating an exemplary telecommunications system having a voice server configured in accordance with the inventive arrangements disclosed herein.

FIG. 1 is a schematic diagram illustrating an exemplary telecommunications system 100 having a voice server 105 configured in accordance with the inventive arrangements disclosed herein. As shown the telecommunications system 100 can include a telecommunications network 110, a gateway 115, the voice server 105, and an application server 120. The telecommunications network 110 can include the public-switched telephone network, wireless networks, as well as any other communications networks capable of supporting voice communications and telephony signaling data. The gateway 115 can serve as an interface between the circuit-switched network environment of the telecommunications network 110 and the packet-switched network environment in which the voice server 105 exists.

The voice server 105, as shown, can include a voice browser 125, a telephony interface 130, speech processing resources 135, a system management component 140, as well as a resource management system 145. The voice browser 125 can provide access to dialog, speech recognition, text-to-speech, call control, and other interactive voice response functions. The voice browser 125 can be configured to execute any of a variety scripts or applications implemented with markup languages suited to the aforementioned functions. For example, the voice browser 125 can retrieve, load, and execute Voice Extensible Markup Language (VoiceXML), speech synthesis markup language, Call Control XML, or other suitable markup language documents. Notably, the Voice Browser Workgroup operating under the auspices of the World Wide Web Consortium is presently attempting to define standards for voice browsers. In any case, the voice browser 125 also can include a data store which specifies associations of call control data, and particularly calling and/or called telephone numbers, with system administration applications to be described herein in greater detail. The data store further can specify associations of voice server events with system administration applications.

The telephony interface 130 can serve as the interface between the voice server 105 and the gateway 115. Accordingly, the telephony interface 130 can route packetized call control data and audio data between the voice server 105 and the gateway 115. The speech processing resources 135 can include a speech recognition engine and a text-to-speech engine. The speech processing resources 135 can be accessed by the voice browser 125 when executing one or more scripts to convert received user speech to text as well as convert text to speech for playback to a caller, for example, through the telephony interface 130.

The system management component 140 serves as an interface to the resource management system 145. Generally, the system management component 140 can translate commands received from the voice browser 125 into a format that can be understood by the resource management system 145, as well as translate information received from the resource management system 145 to a format suitable for use by the voice browser 125. Accordingly, the system management component 140 facilitates communications between the resource management system 145 and the voice processing functionality of the voice server 105.

The resource management system 145 can be implemented, for example, as a Java Management Extension (JMX) enabled system. As noted, JMX defines an architecture, design patterns, application programming interfaces, and services for application and network management and monitoring in the Java programming language. The JMX specification defines how to instrument Java code, create smart Java agents, implement distributed management middleware and managers, and smoothly integrate these solutions into existing management and monitoring systems.

The application server 120 can communicate with the voice server 105, and the voice browser 125 through a data communications protocol suitable for exchanging applications, markup language documents, and/or scripts. According to one embodiment of the present invention, the application server 120 can communicate using Hypertext Transfer Protocol (HTTP), but is not limited to such a configuration.

The application server 120 can include a data store 150, having stored therein one or more system administration applications. More particularly, the system administration applications can include one or more markup language documents or scripts, including scripts capable of dynamic markup language generation, which can be executed within the voice browser 125. The system administration applications can perform administrative functions that traditionally were accessed through an administrative console.

For example, the data store 150 can include system administration applications configured to handle inbound calls from a system administrator 155 which permit the caller to interact with the voice server 105 and perform administrative functions to the voice server 105. The data store 150 also can include system administration applications configured to initiate outbound calls in the event a failure or other event is detected within the voice server 105. Such a system administration application can be configured to query the voice server 105 to determine relevant administration information about the triggering event so that the determined information can be communicated to the system administrator 155 when called.

As noted, the application server 120 can include programs, for example servlets, which can dynamically generate system administration applications such as markup language documents. Such programs for dynamic generation of system administration applications can be provided to the voice server 105, and more particularly, to a virtual machine executing within the voice server 105. The applications, upon execution, can generate appropriate system administration applications to be executed by the voice browser 125.

According to another embodiment of the present invention, the applications for dynamic generation of system administration applications can execute within a virtual machine disposed within the application server 120. In that case, the applications can be called via the voice server, and upon execution, generate system administration applications such as markup language documents which can be provided to the voice browser 125 for execution.

Those skilled in the art, however, should appreciate that although the present invention can utilize a voice browser for executing telephony-based system administration applications, any of a variety of different application environments can be used. For example, possible application execution environments can include an application programming interface (API) for use with Java Beans wherein telephony-based system administration applications are implemented as Java Beans, or a Speech Applications Language Tags (SALT) compliant application execution environment. Further, as new markup language standards continue to emerge and evolve, appropriate markup language formats can be used to implement system administration applications which can execute within a suitable browser or virtual machine. Accordingly, any of a variety of application platforms and application formats can be used.

In operation, the system administrator 155 can call the voice server 105 via the telecommunications network 110 and the gateway 115. Call control and audio data for the call can be provided to the telephony interface 130 from the gateway 115. The telephony interface 130 can provide the audio data and call control data to the voice browser 125 for processing. The voice browser 125, having received the call control data, can match the inbound call to an appropriate system administration application using the data store of associations between system management applications and call control data. Accordingly, the voice browser 125 can retrieve the determined system administration application from the application server 120, load the system administration application, and execute the system administration application.

Once the system administration application begins execution, the voice browser 125 can process speech input and keypad input such as dual tone multi-frequency input signals from the system administrator 155. The voice browser 125 can route audio and keypad information to the speech processing resources 135 for conversion to text or other appropriate data representations. Similarly, any text which originates within the voice server 105 that is to be provided to the calling system administrator 155 can be routed to the speech processing resources 135 by the voice browser 125 for conversion to speech. The resulting speech can be played back to the system administrator 155 over the established call.

Notably, inputs from the system administrator 155, whether keypad or speech, once converted to text or another suitable data format, can be provided from the voice browser 125 to the system management component 140. The system management component 140 can translate any received input to a format that is compatible with the resource management system 145. In this manner, the system administrator can query the voice server 105, and perform any necessary administrative tasks over a telecommunications network connection.

Information determined by the resource management system 145 such as codes, flags, or other events can be provided to the system management component 140 for translation to a text format which can be provided to the voice browser 125. The information can be text-to-speech converted by the speech processing resources 135, and eventually played to the calling system administrator.

Accordingly, functionality which typically is available only through an administrative console can be provided to system administrators calling from remote locations through the telecommunications network 110. Notably, a system administrator that is "on-premises" with the voice server 105 also can call the voice server 105 to perform administrative functions and need not access an administrative console or terminal.

The voice server configuration disclosed herein also can initiate outbound calls to one or more designated numbers. The system management component 140 can receive events from the resource management system 145. Responsive to particular events, the system management component 140 can direct the voice browser 125 to retrieve one or more system administration applications which, when executed, can initiate a call to a designated number. Once the call has been established with the number, the system administrator 155 can interact with the voice server 105 as described. Notably, the voice server 105 can initiate calls to pagers or other communications devices to provide notification of a detected event or condition.

Figure 2:
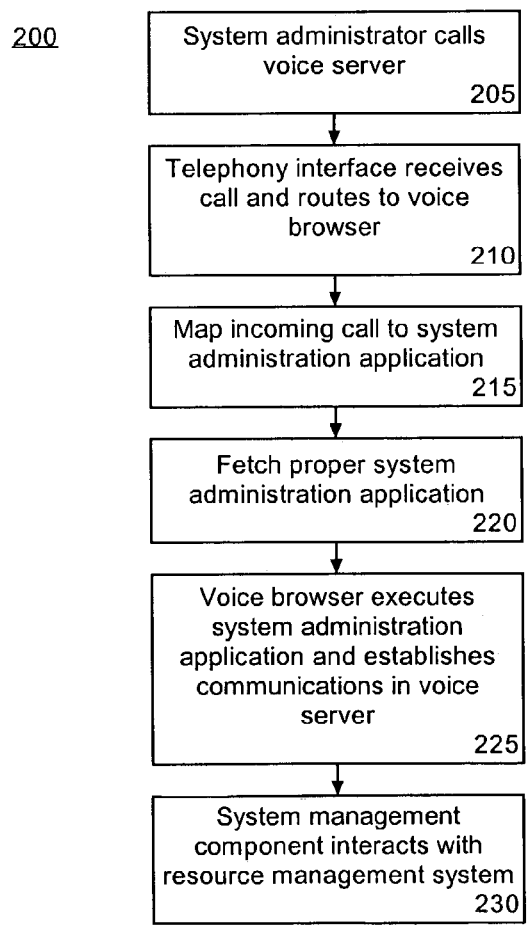
FIG. 2 is a flow chart illustrating a method of administering a voice server through a telecommunications network according to the present invention.

FIG. 2 is a flow chart illustrating a method 200 of administering a voice server through a telecommunications network according to the present invention. The method 200 can begin in step 205 where a system administrator can place a call to the voice server. The call can be placed over a conventional landline or wireless communication link through the telecommunications network. For example, the system administrator can call a private telephone number reserved for use by, and distributed only to authorized personnel.

Notably, although not shown in FIG. 2, it should be appreciated that one or more security measures can be used to verify the identity of a caller. For example, as the voice server is equipped with speech processing resources, voice matching technology as well as one or more passwords, whether keyed or spoken, can be used for identifying the calling system administrator.

In step 210, the telephony interface in the voice server can receive the call from the system administrator. The audio data and call control data associated with the received call can be routed to the voice browser. In step 215, the voice browser can determine the appropriate system administration application to retrieve to process the received call. For example, the voice browser can utilize the calling number, the called number, or a combination of both as specified by the call control information received from the telephony interface to identify a system administration application.

In step 220, the voice browser can fetch the determined system administration application from the application server data store. Once retrieved, the system administration application can be loaded into the voice browser. In step 225, the voice browser can execute the system administration application. Accordingly, communications can be established between the system administration application and the resource management system. In step 230, the system administration application can receive speech and/or keypad data from the system administrator, process that data, and provide commands, queries, or instructions to the resource management system via the system management component. Likewise, information determined by the resource management system can be provided to the system administration application executing in the voice browser via the system management component. The voice browser can provide the information to the speech processing resources to convert the data to speech to be provided to the system administrator over the established call.

Figure 3:
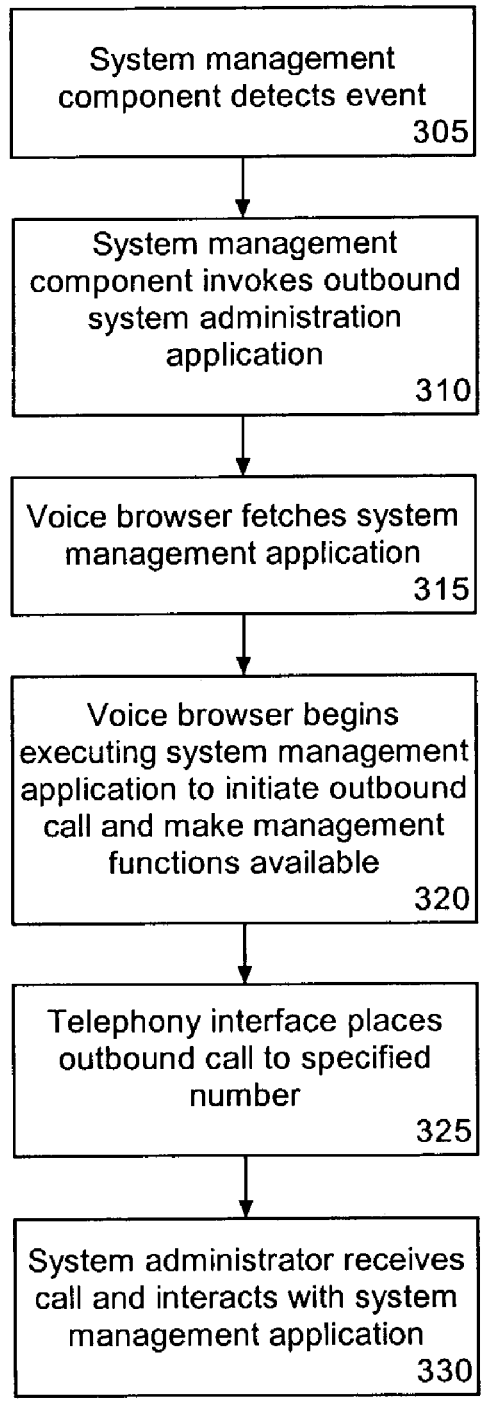
FIG. 3 is a flow chart illustrating a method of notifying a user of a condition in a voice server via a telecommunications network in accordance with the present invention.

FIG. 3 is a flow chart illustrating a method 300 of notifying a user of a condition in a voice server via a telecommunications network in accordance with the present invention. The method 300 can begin in step 305 where the system management component of the voice server detects an event. The system management component, being in communication with the resource management system, can receive voice server system events from the resource management system. The term events, as used herein, can refer to messages, operating conditions, internal alarms or any other internally generated data of the voice server which can indicate a need for contacting a system administrator.

For example, the resource management system can be configured to provide all events to the system management component and allow the system management component to determine which events are relevant for purposes of contacting a system administrator. For instance, the system management component can compare each event to a listing of events which have been determined to be problematic or likely to require administrative attention. Alternatively, only selected events which have been determined to be of significance can be provided to the system management component. Regardless, the received event can indicate a condition or operational state within the voice server which requires administrative attention.

In step 310 the system management component can invoke the voice browser such that a system administration application will be executed. The system management component can notify the voice browser of the particular received voice server system event. Accordingly, the voice browser can cross-reference the received event with one or more system administration applications stored in the application server. In an alternative embodiment of the present invention, the system management component can include necessary data for cross-referencing one or more particular system administration applications according to the event received from the resource management system.

It should be appreciated that although a one to one correspondence can exist between voice server system events and system administration applications, according to another aspect of the present invention, multiple events can be mapped to one or more system administration applications. Accordingly, the proper system administration application can be selected based upon a series of events which can, for example, indicate an escalating condition within the voice server.

In step 315, the voice browser can fetch the determined system administration application from the application server data store. In step 320, the voice browser can load and execute the retrieved system administration application. Execution of the system administration application can cause the voice server, and in particular, the telephony interface of the voice server, to initiate an outbound call to a predetermined number. In addition, the system administration application can establish communications with the resource management system via the system management component.

In step 325, the telephony interface can place the outbound call. In step 330, the call can be established with the called number. Accordingly, the system administrator can receive the call. Once the call is established, the voice server can provide administrative information describing the detected condition to the system administrator. The system administrator can interact with the voice server to perform one or more administrative functions.

According to another aspect of the present invention, the predetermined number can correspond to a messaging device rather than a conventional telephone or other voice communications device. Accordingly, the system administration application can be configured to deliver a text message to the called device. The text message can indicate the detected event or condition within the voice server. Regardless of the device called by the voice server, it should be appreciated that additional information beyond the particular triggering event can be provided to the called device. For example, the system administration application can be configured to query the voice server and acquire specific information according to the detected event or events. This information can be provided to the called device in a desired format.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of administering a voice server comprising:
    within a voice server, receiving through a telephone interface a call from a system administrator and connecting the call to a voice enabled browser;
    in the voice enabled browser, matching call control data of the call with a system administration application of the voice server by identifying at least one of a called number and a calling number for identifying a system administration application to execute;
    retrieving and loading into the voice enabled browser a Voice Extensible Markup Language (VXML) program corresponding to the system administration application;
    executing the VXML program within the voice enabled browser; and
    responsive to said executing step, establishing communications between the system administration application and a resource management system of the voice server; and
    processing voice commands in the VXML script for administrating control of operating events within the resource management system for managing problematic conditions, wherein the managing includes querying a management extension object to provide event status of problematic operating conditions;
    wherein the system administrator interacts with the resource management system through the VXML program to request administrative functions over the call.

2. The method of claim 1, further comprising:
    receiving voice input from the system administrator over the call;
    processing the voice input to determine an administrative function for the voice server which corresponds to the voice input by submitting the voice input to a speech recognition system for converting the voice input to a command; and
    activating the administrative function using the command within the voice server through the resource management system.

3. The method of claim 2, wherein the input is selected from the group consisting of speech signals and dual tone multi-frequency signals.

4. The method of claim 1, further comprising:
    providing administrative information over the call.

5. The method of claim 1, further comprising:
    the system administration application querying the resource management system for administrative information.

6. The method of claim 1, wherein the resource management system comprises a Java Management Extension enabled system.

7. The method of claim 1, wherein the resource management system comprises a Simple Network Management Protocol based system.

8. The method of claim 1, further comprising:
    retrieving the system administration application from an application server; and
    loading the system administration application into a voice browser included within the voice server.

9. The method of claim 8, wherein the system administration application comprises a Voice Extensible Markup Language document.

10. A method of administering a voice server comprising:
    detecting an escalating triggering event within the voice server, wherein an escalating event is a series of triggering events;

determining whether the escalating triggering event is a problematic operating condition by comparing the series of triggering events to a list of events which have been determined to be problematic or that have historically required administrative attention, and if so;

matching the escalating triggering event with a predetermined system administration application for resolving the problematic operating condition;

invoking the predetermined system administration application thereby establishing communications between the system administration application and a resource management system of the voice server; and placing an outbound call to a number specified by the system administration application for reporting the problematic operating condition and providing administrative control over the call.

11. The method of claim 10, wherein the resource management system comprises a Java Management Extension enabled system.

12. The method of claim 10, wherein the resource management system comprises a Simple Network Management Protocol based system.

13. The method of claim 10, further comprising;
the system administration application querying the resource management system for administration information corresponding to the triggering event.

14. The method of claim 10, further comprising:
providing administration information associated with the triggering event over the call.

15. The method of claim 10, said invoking step comprising:
instructing a voice browser within the voice server to retrieve the system administration application;
retrieving the system administration application from an application server;
loading the system administration application into the voice browser; and
executing the system administration application.

16. The method of claim 15, wherein the system administration application comprises a Voice Extensible Markup Language document.

17. The method of claim 10, further comprising:
receiving input from a system administrator via the call;
processing the input to determine an administrative function for the voice server which corresponds to the input; and
activating the administrative function within the voice server.

18. A method of administering a voice server comprising:
within a voice server, receiving a call from a system administrator;
matching call control data of the call with an application configured to dynamically generate a system administration application of the voice server by
identifying at least one of a called number and a calling number for identifying a system administration application to execute;
executing the application to generate the system administration application; and
executing the system administration application thereby establishing communications between the system administration application and a resource management system of the voice server; and
determining whether the call identifies a problematic operating condition by comparing a list of events which have been determined to be problematic or that have historically required administrative attention to said voice input, wherein the list of events are gathered through an inquire to a management extension object, and if so:

from the system administration application, providing voice command administrative control Through a Voice Extensible Markup Language (VXML) interface for resolving the problematic condition, wherein the system administrator interacts with the resource management system to request administrative functions over the call.

19. The method of claim 18, said step of executing the application to generate the system administration application comprising;
detecting an operational state of the voice server; and
generating the system administration application in accordance with the detected operational state.

20. A method of administering a voice server comprising:
detecting an escalating triggering event within the voice server, wherein an escalating event is a series of triggering events;
determining whether the escalating triggering event is a problematic operating condition by comparing the series of triggering events to a list of events which have been determined to be problematic or that have historically required administrative attention, and if so:
matching the triggering event with a predetermined application configured to dynamically generate a system administration application of the voice server for resolving the problematic operating condition;
executing the application to generate the system administration application; and
invoking the dynamically generated system administration application thereby establishing communications between the system administration application and a resource management system of the voice server; and
placing an outbound call to a number specified by the system administration application for reporting the problematic operating condition and providing administrative control over the call.

21. A voice server which can be administered via a telecommunications link, said voice server comprising:
an application execution environment for monitoring problematic operating conditions within a resource management system of a voice server;
a telephony-enabled system administration application executing within the application execution environment of the voice server supporting a Voice Extensible Markup Language (VXML) enabled browser;
a telephony interface configured to place outbound calls or to receive inbound calls thereby establishing a telecommunications link under the direction of the telephony-enabled system administration application, wherein said telephony interface routes calls to the VXML enabled browser for processing voice commands that administer control over the resource management system;
wherein the resource management system is configured to monitor and manage resources of the voice server by querying a management extension object to provide a list of events associated with the problematic operating conditions; and
a system management component configured to exchange communications between the telephony-enabled system administration application and the resource management system, wherein the system management component executes a VXML program for managing the events associated with the problematic operating conditions through voice commands.

22. The voice server of claim 21, wherein the resource management system responds to administration commands received over the telecommunications link.

23. The voice server of claim 21, wherein the resource management system provides administration information to the telephony-enabled system administration application to be played over the telecommunications link.

24. A machine-readable storage, having stored thereon a computer program having a plurality of code sections executable by a machine for causing the machine to perform the steps of:
   within a voice server, receiving through a telephone interface a call from a system administrator and connecting the call to a voice enabled browser;
   in the voice enabled browser, matching call control data of the call with a system administration application of the voice server by identifying at least one of a called number and a calling number for identifying a system administration application to execute;
   retrieving and loading into the voice enabled browser a Voice Extensible Markup Language (VXML) script corresponding to the system administration application;
   executing the VXML program within the voice enabled browser; and
   responsive to said executing step, establishing communications between the system administration application and a resource management system of the voice server; and
   processing voice commands in the VXML script for administrating operating events within the resource management system for managing problematic conditions, wherein the managing includes querying a management extension object to provide event status of problematic operating conditions;
   wherein the system administrator interacts with the resource management system through the VXML program to request administrative functions over the call.

25. The machine-readable storage of claim 24, further comprising:
   receiving voice input from the system administrator over the call;
   processing the voice input to determine an administrative function for the voice server which corresponds to the voice input by submitting the voice input to a speech recognition system for convening the voice input to a command; and
   activating the administrative function using the command within the voice server through the resource management system.

26. The machine-readable storage of claim 25, wherein the input is selected from the group consisting of speech signals and dual tone multi-frequency signals.

27. The machine-readable storage of claim 24, further comprising:
   providing administrative information over the call.

28. The machine-readable storage of claim 24, further comprising:
   the system administration application querying the resource management system for administrative information.

29. The machine-readable storage of claim 24, wherein the resource management system comprises a Java Management Extension enabled system.

30. The machine-readable storage of claim 24, wherein the resource management system comprises a Simple Network Management Protocol based system.

31. The machine-readable storage of claim 24, further comprising:
   retrieving the system administration application from an application server; and
   loading the system administration application into a voice browser included within the voice server.

32. The machine-readable storage of claim 31, wherein the system administration application comprises a Voice Extensible Markup Language document.

33. A machine readable storage, having stored thereon a computer program having a plurality of code sections executable by a machine for causing the machine to perform the steps of:
   detecting an escalating triggering event within the voice server, wherein an escalating event is a series of triggering events;
   determining whether the escalating triggering event is a problematic operating condition by comparing the series of triggering events to a list of events which have been determined to be problematic or that have historically required administrative attention, and if so:
   matching the escalating triggering event with a predetermined system administration application for resolving the problematic operating condition;
   invoking the predetermined system administration application thereby establishing communications between the system administration application and a resource management system of the voice server; and
   placing an outbound call to a number specified by the system administration application for reporting the problematic operating condition and providing administrative control over the call.

34. The machine-readable storage of claim 33, wherein the resource management system comprises a Java Management Extension enabled system.

35. The machine-readable storage of claim 33, wherein the resource management system comprises a Simple Network Management Protocol based system.

36. The machine-readable storage of claim 33, further comprising:
   the system administration application querying the resource management system for administration information corresponding to the triggering event.

37. The machine-readable storage of claim 33, further comprising:
   providing administration information associated with the triggering event over the call.

38. The machine-readable storage of claim 33, said invoking step comprising:
   instructing a voice browser within the voice server to retrieve the system administration application;
   retrieving the system administration application from an application server;
   loading the system administration application into the voice browser; and
   executing the system administration application.

39. The machine-readable storage of claim 38, wherein the system administration application comprises a Voice Extensible Markup Language document.

40. The machine-readable storage of claim 33, further comprising:
   receiving input from a system administrator via the call;

processing the input to determine an administrative function for the voice server which corresponds to the input; and activating the administrative function within the voice server.

41. A machine readable storage, having stored thereon a computer program having a plurality of code sections executable by a machine for causing the machine to perform the steps of:

within a voice server, receiving a call from a system administrator;

matching call control data of the call with an application configured to dynamically generate a system administration application of the voice server by identifying at least one of a called number and a calling number for identifying a system administration application to execute;

executing the application to generate the system administration application; and executing the system administration application thereby establishing communications between the system administration application and a resource management system of the voice server; and determining whether the call identifies a problematic operating condition by comparing a list of events which have been determined to be problematic or that have historically required administrative attention to said voice input, wherein the list of events are gathered through an inquiry to a management extension object, and if so:

from the system administration application, providing voice command administrative control through a Voice Extensible Markup Language (VXML) interface for resolving the problematic condition, wherein the system administrator interacts with the resource management system to request administrative functions over the call.

42. The machine-readable storage of claim 41, said step of executing the application to generate the system administration application comprising:

detecting an operational state of the voice server; and generating the system administration application in accordance with the detected operational state.

43. A machine readable storage, having stored thereon a computer program having a plurality of code sections executable by a machine for causing the machine to perform the steps of:

detecting an escalating triggering event within the voice server, wherein an escalating event is a series of triggering events;

determining whether the escalating triggering event is a problematic operating condition by comparing the series of triggering events to a list of events which have been determined to be problematic or that have historically required administrative attention, and if so:

matching the triggering event with a predetermined application configured to dynamically generate a system administration application of the voice server for resolving the problematic operating condition;

executing the application to generate the system administration application; and invoking the dynamically generated system administration application thereby establishing communications between the system administration application and a resource management system of the voice server; and placing an outbound call to a number specified by the system administration application for reporting the problematic operating condition and providing administrative control over the call.

* * * * *